Jan. 23, 1951 R. LOEWY 2,539,146

TRANSPARENT BLOCK RADIO CABINET

Filed March 19, 1947 5 Sheets-Sheet 1

INVENTOR.
RAYMOND LOEWY
BY
Ostrolenk & Faber
ATTORNEYS

Jan. 23, 1951 R. LOEWY 2,539,146

TRANSPARENT BLOCK RADIO CABINET

Filed March 19, 1947 5 Sheets-Sheet 2

INVENTOR.
RAYMOND LOEWY
BY
Ostrolenk & Faber
ATTORNEYS

TRANSPARENT BLOCK RADIO CABINET

Filed March 19, 1947 5 Sheets-Sheet 3

INVENTOR.
RAYMOND LOEWY
BY
Ostrolenk & Faber
ATTORNEYS

Jan. 23, 1951 R. LOEWY 2,539,146

TRANSPARENT BLOCK RADIO CABINET

Filed March 19, 1947 5 Sheets-Sheet 4

INVENTOR.
RAYMOND LOEWY
BY
Ostrolenk & Faber
ATTORNEYS

Jan. 23, 1951　　R. LOEWY　　2,539,146

TRANSPARENT BLOCK RADIO CABINET

Filed March 19, 1947　　5 Sheets-Sheet 5

INVENTOR.
RAYMOND LOEWY
BY
Ostrolenk & Faber
ATTORNEYS

Patented Jan. 23, 1951 2,539,146

UNITED STATES PATENT OFFICE 2,539,146

TRANSPARENT BLOCK RADIO CABINET

Raymond Loewy, Sands Point, N. Y.

Application March 19, 1947, Serial No. 735,593

14 Claims. (Cl. 250—14)

My present invention relates to radios and more particularly to novel and simply manufactured housings therefor, as well as to simplified operating means for the tuning condenser, novel baffle construction for the loud speaker, and novel mounting for a loop antenna, all combined and integrated with the novel housing for the radio.

My invention specifically contemplates the formation of a radio cabinet in such manner that it comprises essentially a block of clear insulating material, the said block being provided with openings and recesses to receive and position the various parts of the radio.

Thus the primary object of my invention is the provision of a novel cabinet or enclosure for a radio set consisting of blocks bored and recessed to contain and position the various radio parts and so arranged that all parts of the radio may be rendered accessible simply by lifting off a part of the cabinet.

Another object of my invention is the arrangement of a novel radio cabinet so that it consists of blocks of translucent or transparent material, bored, and recessed to support and position the radio parts.

Another object of my invention is the formation of a novel radio cabinet of transparent material so arranged that functional parts of the radio itself become visible to form part of the final design.

Another object of my invention is the provision of a novel loud speaker baffle arrangement which includes recesses in the blocks forming the cabinet for supporting and positioning the loud speaker as well as additional baffle means where they may be required.

Still another object of my invention is the provision of novel tuning means in connection with my novel radio cabinet and the arrangement of a novel method of cooperation between the tuning means and the cabinet to provide readily visible indicia showing the position of the tuning means.

Another object of my invention is the provision of novel ventilating means for my radio cabinet.

Another object of my invention is the provision of novel means for mounting a loud speaker including the utilization of the chassis itself as part of the baffle structure.

Another object of my invention is the mounting of the volume control knob in the speaker opening of my cabinet.

Another object of my invention is the provision of novel loop antenna mounting means in connection with my novel cabinet.

Another object of my invention is the arrangement and construction of a novel loop antenna.

The foregoing and many other objects of my invention will become apparent in the following description and drawings in which.

Figure 1:
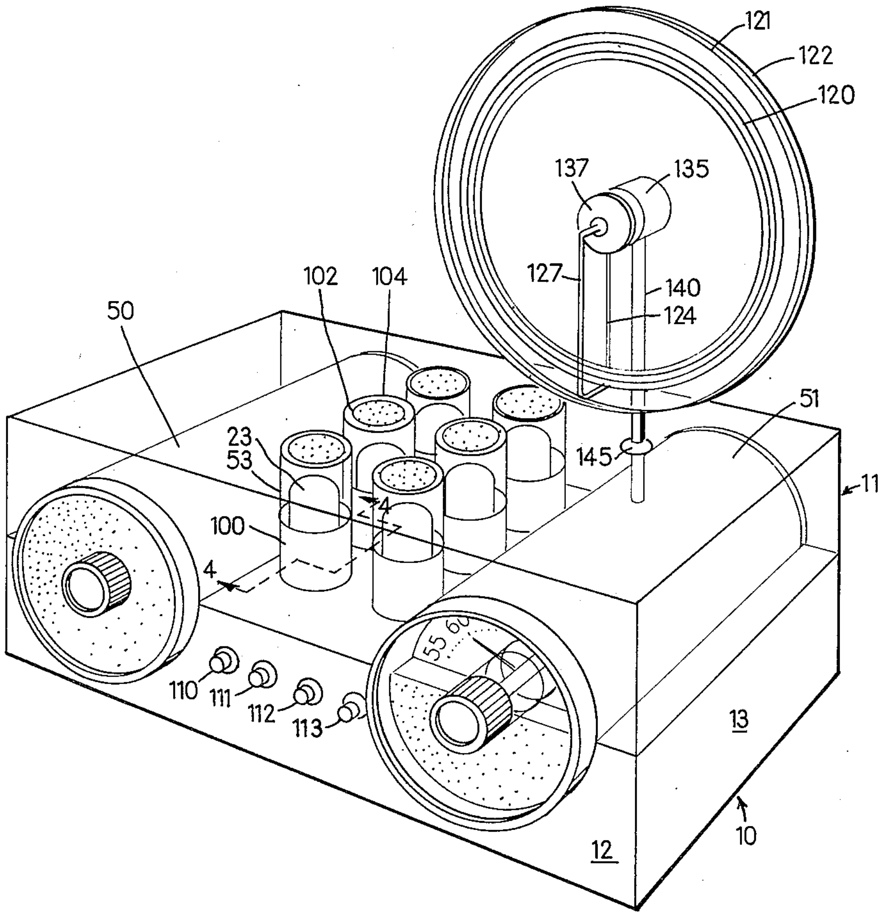
Figure 1 is a view in perspective of my novel radio cabinet.
Figure 2:
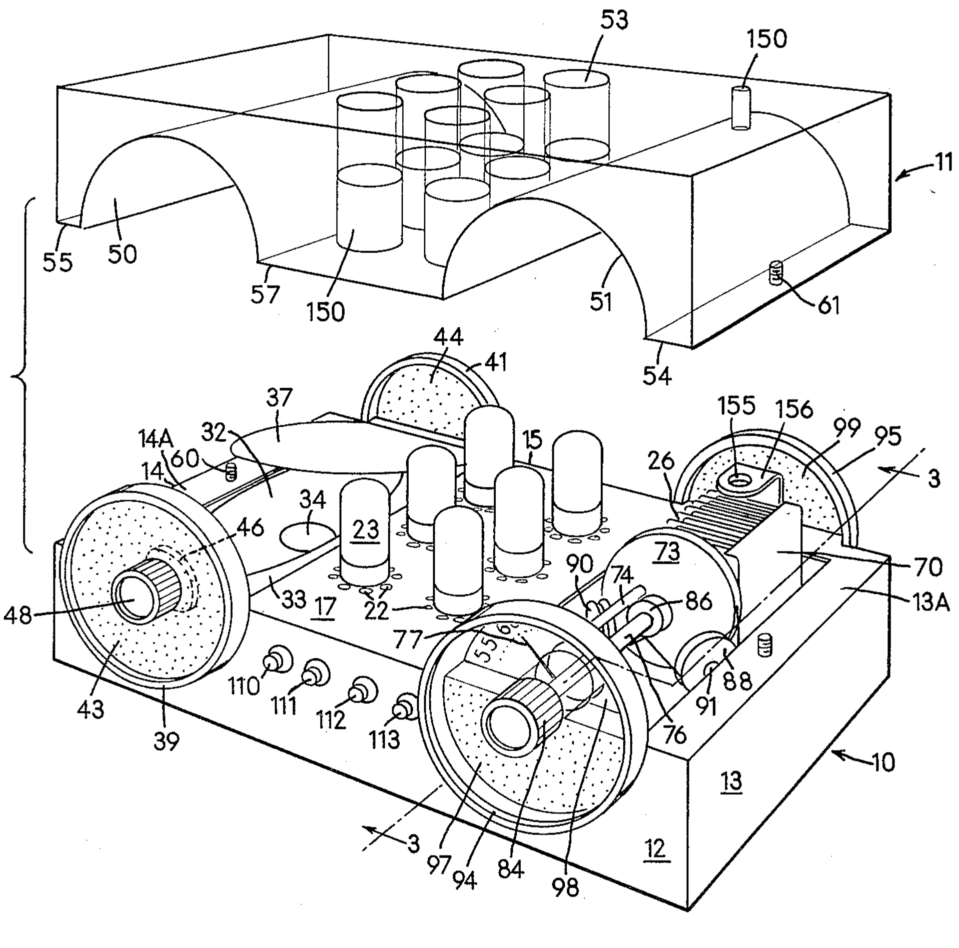
Figure 2 is an expanded view of my novel radio cabinet showing the block-like parts thereof separated, and the means for supporting the various operating elements.
Figure 7:
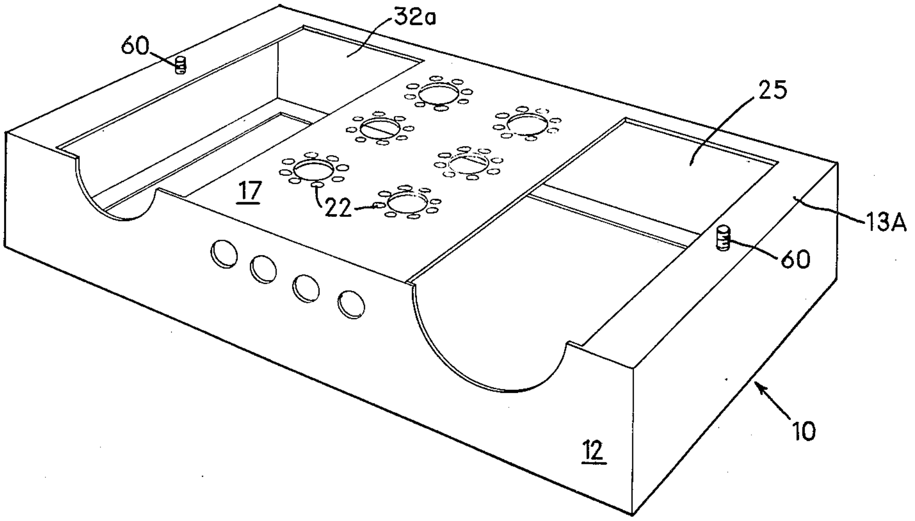
Figure 7 is a view in perspective of the chassis pan of my novel cabinet.

Referring now to Figure 1, 2 and 7, my novel radio cabinet comprises a chassis pan or base section 10 and a translucent or transparent plastic top section 11. The chassis 10 is preferably metallic although it may be made of any suitable material and may have any desired ornamental surfacing or veneer including plastic sheeting which may match the top section. The chassis 10 has a front wall 12, side walls 13 and 14, a back wall 15 and a top wall 17.

Top wall 17 of chassis 10 is provided with openings 21 receiving the sockets for the tubes 23. Small openings 22 surround each of the tube socket openings 21 for ventilation purposes as hereinafter described. The top wall 17 is cut out at 25 on the right side to provide a recess for the tuning condenser, and is cut out at 32a on the left side to provide a recess for the speaker. The flange 33 of speaker 32 is bolted to the portion of top wall 17 surrounding opening 32a.

A deflecting baffle plate 31 is mounted over the speaker 32, being sloped to direct the sound from the loud speaker towards the front.

The front of wall 12 of chassis 10 in front of the speaker 32 is provided with a metallic ring 39 secured in any suitable manner to the said wall 12, half of the ring 39 projecting above the top of wall 12. The metallic ring 39 is preferably finished outside and inside with a mirror finish having either a silver or gold appearance, but which, of course, may be of any appropriate color. A similar ring 41 is secured to the back wall 15 axially aligned with the front ring 39 and finished in the same manner as the front ring 39. A perforated plate 43 is secured in any suitable manner in the front ring 39 and a similar perforated metal plate 44 is secured in the back ring 41. The perforations in the front plate 43 provide an exit for the sound from the loud speaker 32.

The front plate 43 carries on the back thereof a volume control 46 of a standard type, the said volume control being appropriately connected to the chassis. The volume control knob 48 operates in an appropriate bearing in the plate 43 and is accessible from the front of the cabinet. The mounting of the volume control knob in the center of the grill establishes a direct functional connection in the mind of the user between the source of sound and its control.

The clear plastic top block 11 is provided with a semi-cylindrical recess 50 registering with the rings 39 and 41. It is also provided with the semi-cylindrical recess 51, registering with the right hand side members of the base as hereinafter described. The center of the block is provided with a series of vertical cylindrical openings 53 which pass over and receive the tubes 23.

When the block 11 is mounted in place on the chassis 10, the surfaces 54 and 55 register with and rest on respectively the ledges 13*a* and 14*a* of walls 13 and 14, and the surface 57 rests on the top panel 17. Any suitable securement means may be used in order to hold the block 11 on block 10. Thus, for instance, where desired, bolts 60 may be inserted from the underside of ledges 13*a* and 14*a* on each side to enter into tapped openings 61 in sections 54 and 55 of the block 11.

Suitable friction securing members or latch members may also be used to intersecure the blocks 11 and base 10. The tops of wall 17 may also have upwardly projecting studs which may be a tight frictional fit in appropriate openings in block 11, or which may pass entirely through openings in block 11 to be held by a nut or knob of clear plastic or other suitable material turned into a counter bore at the upper end of the openings in block 11. Or appropriately cross-sectioned registering key-ways may be formed in meeting edges of blocks 10 and 11, and sliding keys may be introduced to hold blocks 10 and 11 together. Also, the tubes 100 hereinafter described may extend from the chassis up through holes 53 and be threaded at the top to receive threaded perforated covers 102.

Figure 3:
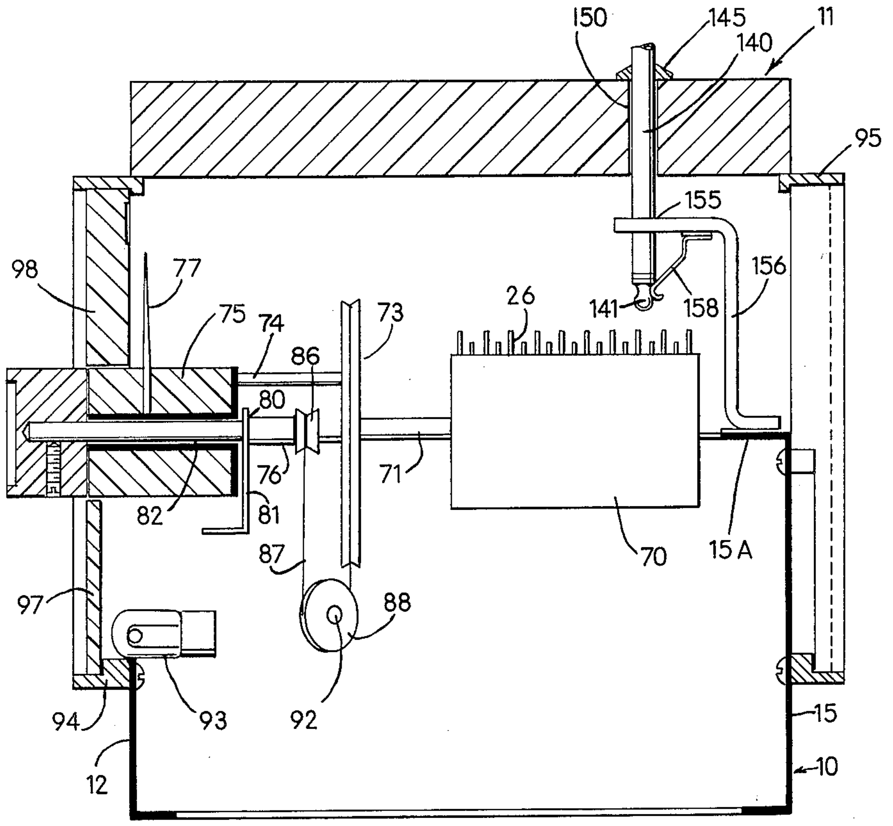
Figure 3 is a cross-sectional view taken from line 3—3 of Figure 2 looking in the direction of the arrows.

As is shown in Figures 2, 3 and 7, the condenser 26 is secured in recess 25, being mounted in an appropriate frame 70 for this purpose. The gang condenser 26 is provided with the operating shaft 71 for rotating the movable condenser plates in the usual manner in order to tune the receiver. Shaft 71 carries at its forward end the pulley disk 73. The pulley disk 73 is connected by the rigid link 74 to the tubular sleeve 75 which rotates freely on the rotatable shaft 76. Thus, whenever the pulley 73 is operated to rotate the movable plates in condenser stack 26, the sleeve 75 rotates exactly in accordance therewith and carries around the pointer 77 mounted thereon to indicate the position of the movable plates of the condenser stack.

The shaft 76 is journalled in an appropriate bearing 80 in the support bracket 81 mounted on the chassis and is also supported in the opening 82 of the sleeve 75 for rotation by tuning knob 84. The inner end of shaft 76 carries the small pulley 86.

As shown in Figures 2 and 3, the cable 87 crosses beneath the pulley 86. One side of the cable is led beneath the diagonally arranged guide pulley 88 to one side of pulley 73 and the other side of the cable is led beneath the diagonally arranged pulley 90 to the other side of the main pulley 73. The diagonally arranged guide pulleys 88 and 90 thus carry the cable 87 so that the portions thereof which engage pulley 86 extend in the plane of pulley 86 and the portions thereof which engage pulley 73 extend in the plane of pulley 73; the cable thus has no tendency whatever to slip off the pulleys 86 and 73.

Pulleys 88 and 89 are supported respectively on shafts 91 and 92 carried in appropriate brackets on the chassis. It will thus be seen that even though the tuning indicator or needle 77 is concentric with the tuning knob 84, a vernier tuning adjustment is obtained since the knob 84 operates through the speed reducing pulley arrangement 86—73 to provide relatively very slow rotation of tuning shaft 71 in response to the rotation of tuning knob 84. But the connection back from pulley disk 73 by the rigid link 74 to the concentric sleeve 75 which carries the indicator or needle 77 provides for a direct indication of the angular position of shaft 71.

The front wall 12 of the base 10 carries the ring 94, half of which protrudes above the top of the said wall as seen in Figure 3. The back wall 15 supports the ring 95 in the same manner. Rings 94 and 95 are finished to have the same appearance as rings 39 and 41. The lower half of the ring 94 is filled with a half-circular plastic disk 97 which extends in front of the front wall of the chassis 10. The upper half of the rings is filled with a half circle 98 of transparent Lucite or other transparent material, suitably marked or scored on the back to provide tuning indicia for registry with the needle.

A pilot light 93 secured to the chassis and located just behind the front wall of chassis 10 causing light to impinge on the lower surface of the half circle of Lucite 98 causing the light to be visible at the scored indicia.

The ring 95 at the rear is also filled with a circle 99 of perforated metallic material similar to the filler for disk 41.

The inner surfaces of the recesses 50 and 51 are finished with a mirror finish corresponding exactly to the finish of rings 39 and 41 and rings 94 and 95 so that when the block 11 is in position on base 10, the rings 39 and 41 together with the inner mirror finish of recess 50 seem to form a single inner mirror finished cylinder visible through the Lucite of the top 11. Similarly, the mirror finish of recess 51 cooperating with rings 94 and 95 appear to form a single continuous mirror finished cylinder visible on the right side through a Lucite of the top 11.

The vertical openings 53 in the top block 11 are provided with a mirror finish 100, at least part way up, which is visible through the block as a series of apparently metallic tubes partly surrounding the radio tubes 23. The mirror finish 100 reflects heat from the tubes.

Where desired, actual cylinders 100 may be used secured to the panel 17. These cylinders 100 may be used for securement purposes as above described.

Figure 4:
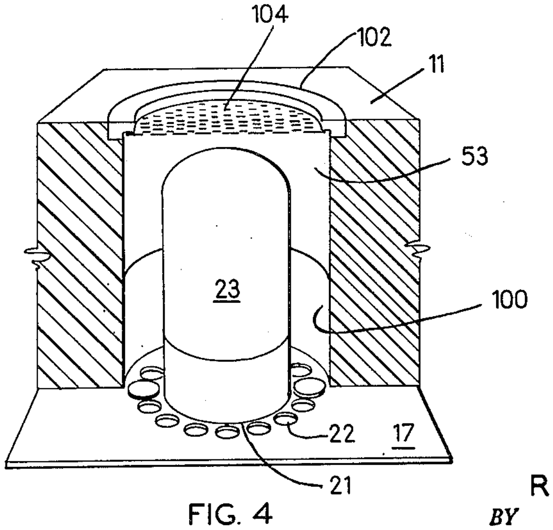
Figure 4 is a cross-sectional view taken from line 4—4 of Figure 1 looking in the direction of the arrows.

The tops of the openings 53 may be finished, if desired, as shown in Figure 4, by a metallic ring 102 treated to have the same finish as rings 39, 41, 94 and 95.

Also a metallic grill or a screen 104 of any other suitable material may be secured in any suitable manner in the ring 102 to close off the top of opening 53 while nevertheless permitting the passage of air therethrough.

Ventilation of the cabinet and of the tubes and removal of heat from the cabinet is then facilitated by the up draft from the small openings 22 into the vertical openings 53 around the radio tubes 23; then out through the top of vertical openings 53 through the grill 104.

Where desired, other controls may, of course, be added. Thus, a push switch 110 may be provided to switch from loud speaker to earphones; a push switch 111 to switch from treble to base; a switch 112 to switch from radio to phonograph; and the on-off switch 113 may also be provided instead of relying on an on-off switch located at the volume control 46.

These switches may be either push switches or rotatable switches; switch knobs may be finished in Lucite or they may be treated so as to have a finish similar to that of rings 39 and 94.

Figure 6:
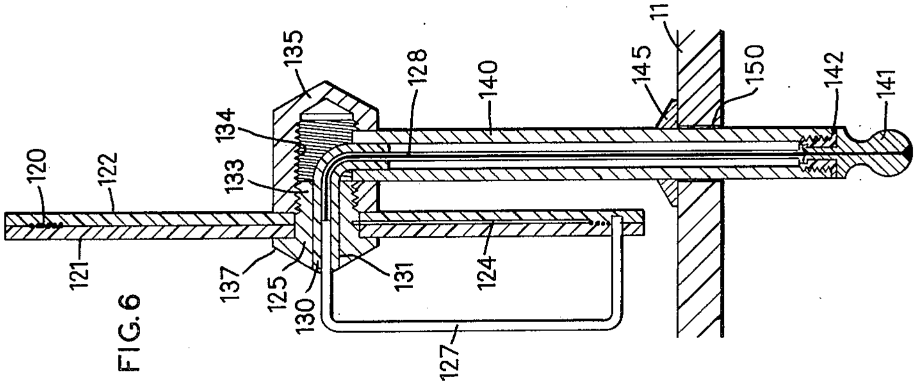
Figure 6 is a cross-sectional view taken from line 6—6 of Figure 5 looking in the direction of the arrows.
Figure 5:
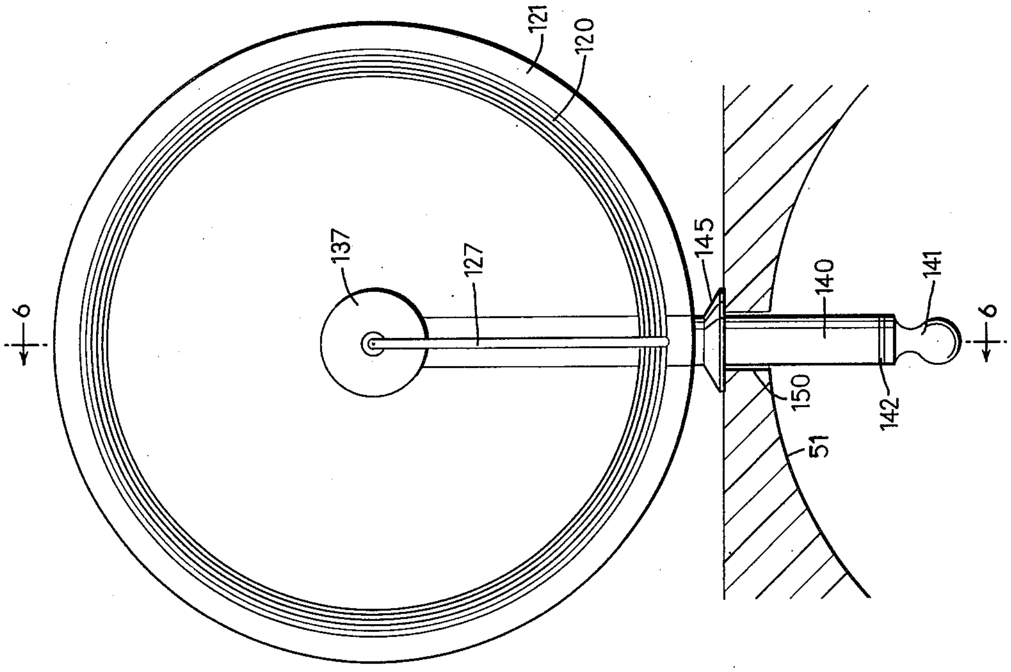
Figure 5 is an elevation of my novel loop antenna.

Means may also be provided in connection with my novel radio cabinet to removably mount a novel loop antenna. My novel loop antenna which is arranged for cooperation with my novel cabinet is shown specifically in Figures 5 and 6. It consists of a loop 120 which is sandwiched between two disks 121 and 122 of Lucite which are pressed together and molded around the loop 120 to form an integral unit. The inner end of the loop is connected by the vertical metal wire 124 to the central metallic supporting stud 125 of the loop. The outer end of the loop is connected by the bent metal wire 127 to the lead 128. The wire 127 passes through the insulating sleeve 130 which is received in the hollow longitudinal opening 131 of the central stud 125. The stud 125 is threaded at 133 to be screwed into the tapped openings 134 of the small supporting metallic housing 135. The stud 125 is provided with the annular flange 137 which thus secures the loop antenna 120—121—122 between the flange 137 and the end of housing 135.

The bottom of housing 135 is secured to the vertical metallic tube 140. The lead 128 passes down the metallic tube 140 being insulated therefrom in any suitable manner and terminates in the metallic knob 141 which in turn is insulated by insulating washer 142 from the metallic tube 140.

The metallic tube 140 is provided with the annular flange 145. When the metallic tube 140 is inserted in the vertical opening 150 in the top of housing block 11, the flange 145 resting on the top of the cabinet determines its position therein as shown in Figure 3.

The tube 140 passes through the opening 155 adjustably supported below opening 150 on the bracket 156. A spring contact member 158 is also carried by bracket 156 but insulated therefrom.

When, therefore, the tube 140 is inserted through the openings 150 and 155, a suitable electrical connection may be made to the tube 140 and another connection may be made to the contact 158 which engages the tip 141 of lead 128. Connections may thus be made to the antenna 120 for ground and for the radio circuit. This connection for the antenna runs from contact 158 and knob 141 up through lead 128 to the bent wire 127, then to the outside of the loop 120 around the loop 120 to the inside of the loop, then through the wire 124 through the metallic stud 125, through housing 135 and back to tube 140. The usual connections are then made from tube 140 and contact 158 to the remainder of the circuit.

The bent wire 127, wire 124, tube 140, stud 125 and its flange 137, as well as housing 135, may all be treated to have a finish similar to that of rings 39 and 94; except that the lower end of tube 140 which engages the sleeve 155 may be treated where necessary to have a good conducting surface.

It will thus be clear that the loop antenna 120 may readily be rotated in its mounting while nevertheless it is always in engagement with sleeve 155 and spring contact 158.

By means of the foregoing, I have provided a novel housing construction which by its mechanical conformation provides a novel and ornamental appearance for the radio set. The loop antenna mounting is so arranged that, instead of detracting from the appearance of the radio sets as has previously been the case where loop antennae were used outside the housing, it enhances the appearance of the radio set by utilizing smooth lines conforming to the lines of the mechanical and ornamental parts of the cabinet itself and by utilizing materials matching the parts of the cabinet.

The mechanical constructions herein described aid, not merely in the operation of the set, but provide a novel simplified mounting for the loud speaker, the radio tubes and the tuning condenser, and also cooperate with the main portion of the cabinet to enhance the novel ornamental appearance.

The particular novel method for operating the tuning condenser herein shown simplifies the appearance of the cabinet and provides a novel vernier adjustment for a needle or tuning pointer which is concentric with the tuning knob.

In the foregoing, I have described my invention solely in connection with preferred illustrative embodiments thereof. Since many variations and modifications of my invention will now be obvious to those skilled in the art, I prefer to be bound not by the specific disclosures herein, but only by the appended claims.

I claim:

1. A radio cabinet including a chassis section and a top section, said top section comprising a block of light transmitting material; radio elements mounted on said chassis; and recesses in said block receiving said radio elements.

2. A radio cabinet including a chassis section and a top section; said top section comprising a block of light transmitting material; radio elements mounted on said chassis; a loud speaker mounted on said chassis; recesses in said block receiving said radio elements; and an additional recess in said block forming a sound chamber for said loud speaker.

3. A radio cabinet including a chassis section and a top section; said top section comprising a block of light transmitting material; radio elements including radio tubes mounted on said chassis; recesses in said block receiving said radio elements and said radio tubes.

4. A radio cabinet including a chassis section and a top section; said top section comprising a block of light transmitting material; radio elements including radio tubes mounted on said chassis; recesses in said block receiving said radio elements and said radio tubes; said recesses comprising an individual recess for each tube.

5. A radio cabinet including a chassis section and a top section; said top section comprising a block of light transmitting material; radio elements including radio tubes mounted on said chassis; recesses in said block receiving said radio elements and said radio tubes; said recesses comprising an individual recess for each tube; each of said individual tube recesses being open at the top.

6. A radio cabinet including a chassis section and a top section; said top section comprising a block of light transmitting material; radio elements including radio tubes mounted on said chassis; recesses in said block receiving said radio elements and said radio tubes; said recesses comprising an individual recess for each tube; each of said individual tube recesses being open at the top; openings in said chassis adjacent each tube; said openings in said chassis and said open top tube recesses providing a ventilating passage for each tube.

7. A radio cabinet including a chassis section and a top section, said top section comprising a block of light transmitting material; radio elements mounted on said chassis; and recesses in said block receiving said radio elements; certain of said recesses having an opaque lining.

8. A radio cabinet including a chassis section and a top section, said top section comprising a block of light transmitting material; radio elements mounted on said chassis; and recesses in said block receiving said radio elements; certain of said recesses having an opaque lining; said lined recesses appearing to be solid structures within said block.

9. A radio cabinet including a chassis section and a top section, said top section comprising a block of light transmitting material; radio elements mounted on said chassis; and recesses in said block receiving said radio elements; certain of said recesses having a light reflecting lining.

10. A radio cabinet including a chassis section and a top section; said top section comprising a block of light transmitting material; radio elements including radio tubes mounted on said chassis; recesses in said block receiving said radio elements and said radio tubes; said recesses comprising an individual recess for each tube; each of said individual tube recesses being open at the top; openings in said chassis adjacent each tube; said openings in said chassis and said open top tube recesses providing a ventilating passage for each tube; and ornamental air permeable covers for the tops of said tube recesses.

11. A radio cabinet including a chassis section and a top section; said top section comprising a block of light transmitting material; radio elements including radio tubes mounted on said chassis; recesses in said block receiving said radio elements and said radio tubes; said recesses comprising an individual recess for each tube; each of said individual tube recesses being open at the top; openings in said chassis adjacent each tube; said openings in said chassis and said open top tube recesses providing a ventilating passage for each tube; ornamental air permeable covers for the tops of said tube recesses; and ornamental front members carried by said chassis matching said ornamental covers.

12. A radio cabinet including a chassis section and a top section, said top section comprising a block of light transmitting material; radio elements mounted on said chassis; recesses in said block receiving said radio elements; and a loop antenna comprising a loop supported within a light transmitting disk; said loop being mounted on top of said cabinet.

13. A radio cabinet including a chassis section and a top section, said top section comprising a block of light transmitting material; radio elements mounted on said chassis; recesses in said block receiving said radio elements; a loop antenna comprising a loop supported within a light transmitting disk; said loop being mounted on top of said cabinet; and a support for said loop antenna; an opening in said block for rotatably receiving said support.

14. A radio cabinet including a chassis section and a top section; said top section comprising a block of light transmitting material; radio elements mounted on said chassis; a loudspeaker mounted on said chassis; recesses in said block receiving said radio elements; an additional recess in said block forming a sound chamber for said loudspeaker; an air permeable closure for one end of said sound chamber; and a volume control member mounted on said air permeable closure.

RAYMOND LOEWY.

REFERENCES CITED

The following references are of record in the file of this patent:

UNITED STATES PATENTS

| Number | Name | Date |
|---|---|---|
| D. 150,277 | Wedemeyer | July 13, 1948 |
| 1,524,105 | Rayder | Jan. 27, 1925 |
| 1,601,968 | Huth | Oct. 5, 1926 |
| 1,634,676 | Meyer | July 5, 1927 |
| 1,666,480 | Zillger | Apr. 17, 1928 |
| 1,713,194 | Ross | May 14, 1929 |
| 1,716,538 | Blackmore | June 11, 1929 |
| 1,778,693 | Semple | Oct. 14, 1930 |
| 1,816,718 | Bond | July 28, 1931 |
| 1,887,185 | Quinby | Nov. 8, 1932 |
| 1,983,322 | Steward | Dec. 4, 1934 |
| 1,995,171 | DeTar | Mar. 19, 1935 |
| 2,070,088 | Montaruli | Feb. 9, 1937 |
| 2,072,240 | Zigler | Mar. 2, 1937 |
| 2,088,454 | Whisk | July 27, 1937 |
| 2,141,423 | Tolerton | Dec. 27, 1938 |
| 2,143,532 | Andrews | Jan. 10, 1939 |
| 2,144,325 | Buchardt | Jan. 17, 1939 |
| 2,187,011 | Braden | Jan. 16, 1940 |
| 2,250,387 | McDonald | July 22, 1941 |
| 2,439,412 | Mitchell | Apr. 13, 1948 |

FOREIGN PATENTS

| Number | Country | Date |
|---|---|---|
| 834,981 | France | Dec. 1938 |
| 558,265 | Great Britain | Dec. 29, 1943 |

OTHER REFERENCES

Radio Retailing, Sept. 1925; article on upper part of page 426.